Sept. 2, 1930.   L. C. GRANT   1,774,969
WIRED WIRELESS SYSTEM
Filed Jan. 13, 1926   3 Sheets-Sheet 3

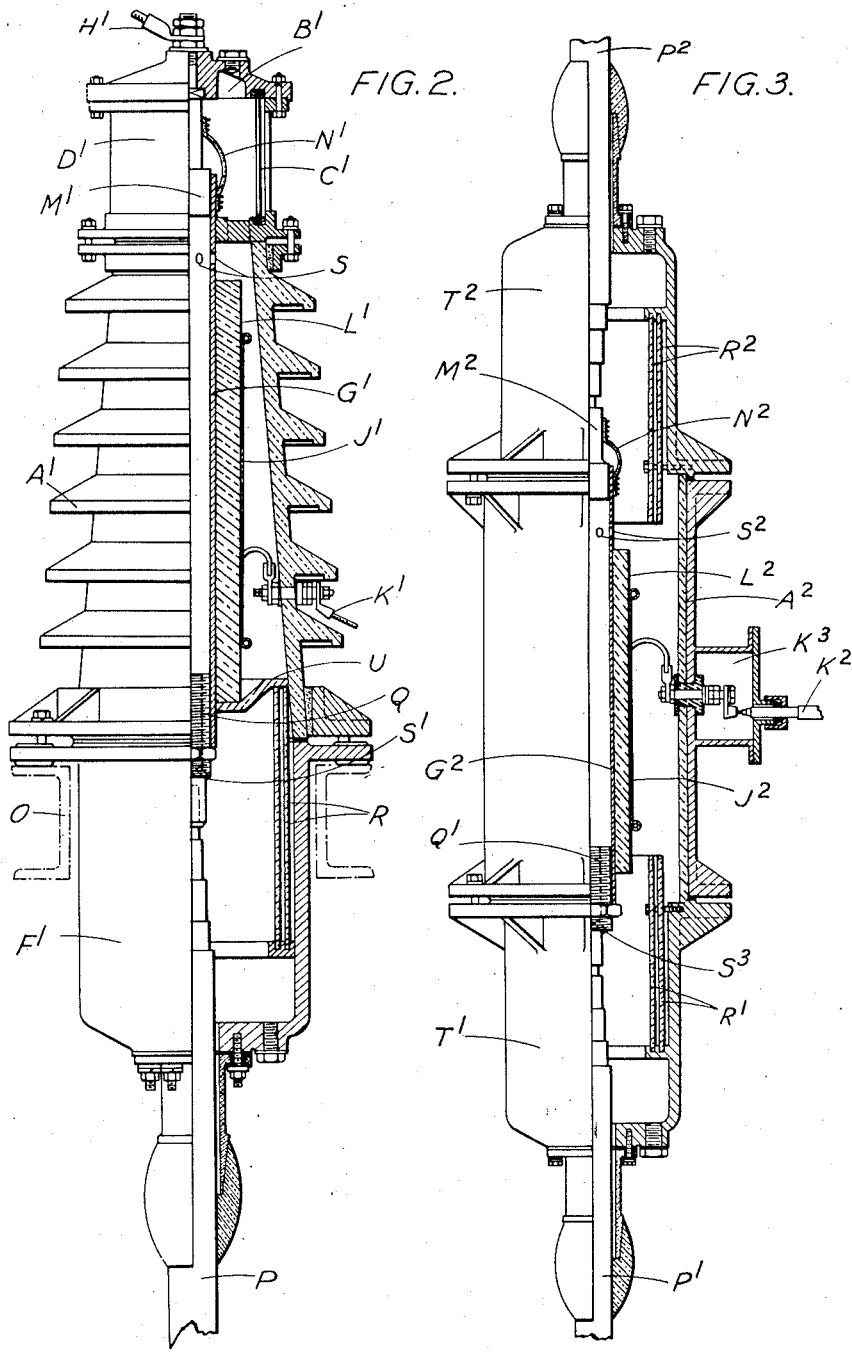

INVENTOR
Lewis Colin Grant
BY
Watson, Coit, Morse & Grindle
ATTORNEY

Patented Sept. 2, 1930

1,774,969

UNITED STATES PATENT OFFICE

LEWIS COLIN GRANT, OF NEWCASTLE-UPON-TYNE, ENGLAND, ASSIGNOR TO ELECTRICAL IMPROVEMENTS LIMITED, OF NEWCASTLE-UPON-TYNE, ENGLAND, A COMPANY OF GREAT BRITAIN

WIRED WIRELESS SYSTEM

Application filed January 13, 1926, Serial No. 81,080, and in Great Britain January 27, 1925.

This invention relates to wired wireless systems wherein high frequency currents are transmitted for telephonic or other purposes over electric power lines, and has for its object to provide a compact and inexpensive form of capacity coupling for use in such systems.

The capacity coupling according to the present invention comprises a body of insulating material which acts simultaneously as an insulator for the power circuit and as a container for a condenser, one of the electrodes of the condenser being connected to the power line, whilst the other is connected to the high frequency apparatus.

The invention is more especially applicable for use with overhead power lines and the insulator-container may be formed of the same size and construction as the insulators usually employed.

One end of the insulator-container may be formed as a cable sealing end, the electrode connected to the power line in this case passing through the container from end to end.

Figure 1:
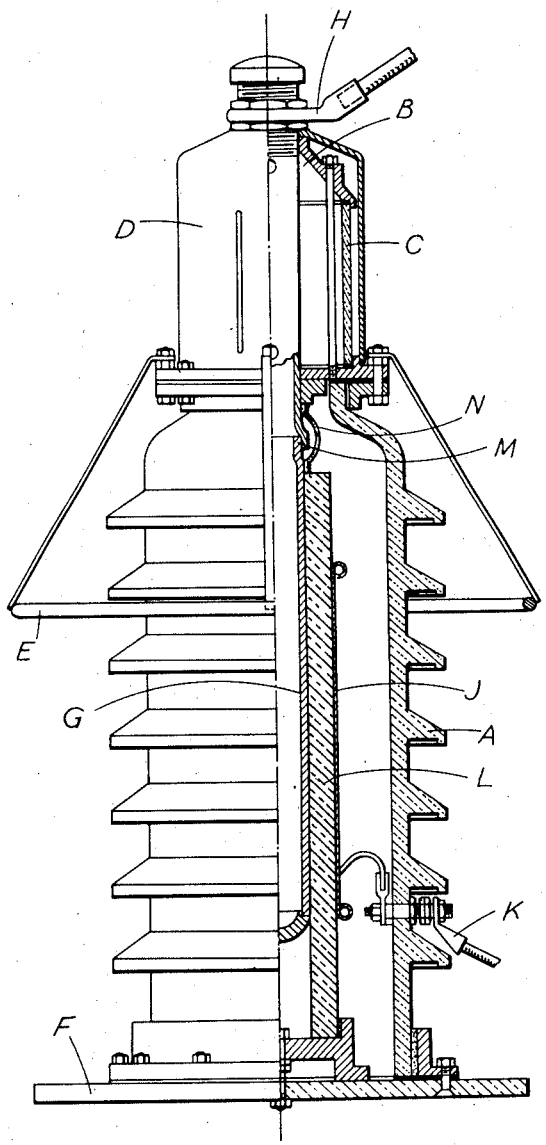
Figure 4:
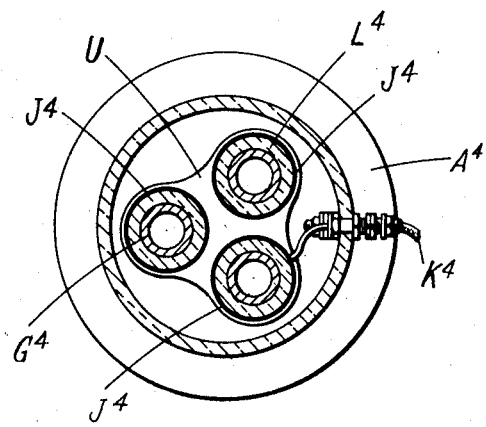
Figure 5:
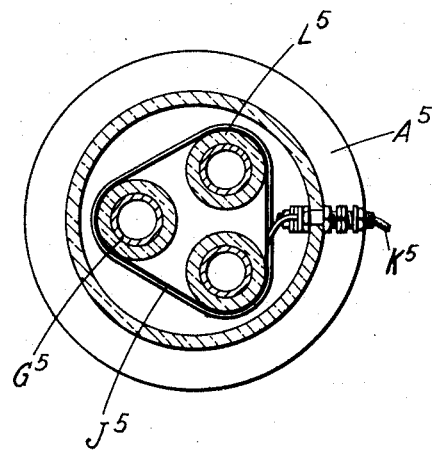

The invention may be carried into practice in various ways but some preferred constructions according thereto are illustrated by way of example in the accompanying drawings, in which Figure 1 is an elevation partly in central section of one construction of capacity coupling according to the invention, Figure 2 is a similar view of a construction in which one end of the insulator-container is formed as a cable sealing end, Figure 3 is a similar view of a construction in which both ends of the insulator-container are formed as cable sealing ends, Figures 4 and 5 show horizontal sectional views illustrating modified arrangements in which multiphase working is used.

In the construction of Figure 1, the insulator-container consists of a hollow insulator A generally similar as regards size and construction to the insulators usually employed with overhead power lines, and having a head B provided with observation windows C protected by a shield D, the usual arcing ring E being provided near the upper end of the insulator. The lower end of the insulator A is closed by means of an insulating base F, which may for example be in the form of a flat plate as shown or of a hemispherical bowl and is adapted to be connected to a supporting bracket mounted on one of the posts which serve to carry the overhead power line.

Disposed centrally within the insulator and entering it from the upper end is a rodlike and preferably tubular electrode G, to the outer end of which the power line is connected at H. This rod G passes downwards to near the lower end of the insulator A, and around its lower end is a small conducting cylinder J, from which a lead K passes through the wall of the insulator, this lead being connected to the high frequency apparatus in the usual manner. The central rod G and the conducting cylinder J constitute the two electrodes of the condenser coupling.

The two electrodes G, J are separated from one another by an insulating medium which is chosen to suit the conditions of any particular case. Thus in some cases filling the insulator-container with oil or other liquid or granular insulating medium will be satisfactory, provided that the medium chosen has suitable insulating and dielectric properties. In other cases it may be desirable as shown to interpose a cylindrical shield L between the two electrodes, this shield being constructed of porcelain or other suitable material. This shield L rests at its lower end on the base F and may be perforated near its lower end to allow the free circulation of oil with which the container may be filled. It will be understood, however, that when such a shield is employed, it may be possible in some cases to dispense with oil within the container. The cylindrical electrode may be in the form of foil or wire wrapped round the shield.

As has been mentioned the type of insulation employed will depend upon the conditions existing. Thus, when as will commonly be the case the high frequency currents are employed for the purpose of telephonic communication, it is extremely important that the insulating medium shall be of such a nature as to prevent the phenomenon known as "corona", the noise arising from which would seriously interfere with the telephonic transmission.

To allow of expansion and contraction under temperature changes, the tubular rod G is preferably formed in two parts (as shown at M), between which small relative motion may take place, the two parts being electrically connected together by means of a flexible conductor N.

When it is desired to make use of the insulator-container for connecting the power line to a cable leading for example to a substation, the construction shown in Figure 2 may be employed.

In this construction the insulator-container as before consists of a hollow-insulator $A^1$ having a head $B^1$ provided with observation windows $C^1$ protected by a shield $D^1$. In this case, however, the lower end of the insulator is bolted to a bowl-shaped body $F^1$ carried on a supporting bracket indicated at O.

Disposed centrally within the insulator $A^1$ is tubular electrode $G^1$, in the upper end of which slides a rod $M^1$ connected to the power line at $H^1$, the rod $M^1$ and the tube $G^1$ being electrically connected together by means of a flexible conductor $N^1$. Surrounding the tube $G^1$ is a sheild $L^1$ of insulating material, around which is a conducting cylinder $J^1$ from which a lead $K^1$ passes to the high frequency apparatus.

The cable P is sealed in the lower end of the bowl $F^1$ and its end passes up centrally within the bowl towards the electrode $G^1$, electrical connection being made with this electrode by means of a hollow plug Q screwed into the lower end of the tube $G^1$. The joint between the insulator $A^1$ and the bowl $F^1$ is covered by concentric insulating sheaths R. For the purpose of allowing the free circulation of oil, the tube $G^1$ is provided with a hole S and another hole $S^1$ is also provided in the plug Q. The insulating shield $L^1$ may be supported at its lower end in any suitable manner as for example by means of an insulating disc or coned member U. Alternately instead of directly supporting the shield $L^1$ the coned member may be arranged to support the tube $G^1$.

Figure 3 illustrates a construction for use when it is desired to couple the high frequency apparatus to the power line at a junction between two sections of the line. In this construction the insulator-container comprises an insulating cylinder $A^2$ closed at each end by means of bowl-shaped bodies $T^1$ $T^2$, in the outer ends of which the two sections $P^1$ $P^2$ of the cable are sealed, the joints between the two bowls and the insulator $A^2$ being covered by insulating sheaths $R^1$ $R^2$ respectively.

Disposed centrally within the insulator $A^2$ is a tubular electrode $G^2$ surrounded by an insulating shield $L^2$, around which is a conducting cylinder $J^2$ constituting the second electrode, this cylinder $J^2$ being connected to the high frequency apparatus by means of a lead $K^2$ passing through an insulating box $K^3$ on the wall of the insulator $A^2$.

The cable end $P^2$ is electrically connected to the electrode $G^2$ by means of a rod $M^2$, which slides within the tube $G^2$, a flexible connection $N^2$ being provided. The cable end $P^1$ is electrically connected to the eletrode $G^2$ by means of a plug $Q^1$ screwed into the end of the tube $G^2$. Holes $S^2$ $S^3$ are provided respectively in the tube $G^2$ and the plug $Q^1$ to allow the free circulation of oil with which the container is filled.

When it is desired to employ multiphase working for the wired wireless system a single insulator-container may be employed if desired. Two such arrangements are illustrated by way of example respectively in Figures 4 and 5, these figures showing cross-sectional views as applied for instance to the arrangement of Figure 1.

In the arrangement of Figure 4, the central conductor G, the insulating cylinder L and the outer electrode J of Figure 1 are replaced by three tubular conductors $G^4$ each surrounded by an insulating cylinder $L^4$ around which is arranged an outer cylindrical electrode $J^4$. The three electrodes $J^4$ are electrically connected together by a spider U to which the outgoing high frequency lead $K^4$ passing through the external insulator $A^4$ is connected. The three electrodes $G^4$ are respectively connected to the three phases of the power line.

In the arrangement of Figure 5 three tubular conductors $G^5$ respectively connected to the three phases of the power line are each surrounded by an insulating cylinder $L^5$, but in this instance a single outer electrode $J^5$ connected to the high frequency lead $K^5$ passing through the external insulator $A^5$ surrounds the group of three insulating cylinders $L^5$.

It will be understood that the particular arrangements described have been given by way of example only and that modifications may be made without departing from the scope of the invention. Thus for example the electrode connected to the high frequency apparatus may only partially surround the other electrode or again the concentric arrangement of the electrodes may be completely departed from if desired.

What I claim as my invention and desire to secure by Letters Patent is:—

1. A capacity coupling for connecting high frequency apparatus with a high voltage electric power line in a wired wireless system, comprising a hollow insulator adapted for high voltage work, an electrode disposed centrally within the insulator, a second electrode disposed within the insulator around the central electrode, a cylindrical body of insulating material between the two electrodes serving as a support for the second electrode, a conductor passing through one end of the insulator and movable telescopically relative to the central electrode, such conductor serving to connect the central electrode to the power line, and means for connecting the second electrode to the high frequency apparatus.

2. In a combined insulator and condenser for high frequency currents, the combination with an insulating container comprising end sections and connecting means therefor, of a pair of electrodes disposed in capacitative relationship within said container, and means for conducting high voltage current through said container, comprising a pair of conductors passing through said end sections, one of said conductors being secured to one of said electrodes, and the other conductor having a telescopic connection with said last named electrode.

3. In a combined insulator and condenser for high frequency currents, the combination with an insulating container comprising end sections and connecting means therefor, of an electrode within said container, and means for conducting high voltage current through said container, comprising a conductor inserted through each end section, one of said conductors being secured to said electrode, and the other of said conductors having a telescopic connection with said electrode, and a second electrode disposed in capacitative relationship with respect to the first and being provided with means for connection to high frequency apparatus, whereby said first named electrode serves to carry high voltage current between said conductors, and to transmit high frequency currents to said apparatus.

4. In a wired wireless system for connecting high frequency apparatus with a high voltage electric power line, the combination with a hollow insulator including a main body portion and a head portion detachably secured thereto, each of said portions being provided with a separate insulating sheath on the interior thereof, of a lead extending from the power line to the head portion of said member, a central electrode disposed within said body portion, a second electrode disposed within the insulator around the central electrode, a solid body of insulating material between the two electrodes acting as a support for the second electrode, means for connecting the central electrode to the power line, and a conductor passing through the wall of the body portion and serving to connect the second electrode to the high frequency apparatus.

5. A capacity coupling for connecting high frequency apparatus with a high voltage electric power line in a wired wireless system, comprising a hollow insulator capable of withstanding the voltage between the power line and earth and the mechanical stresses associated therewith, a rigid tubular electrode disposed centrally within the insulator, a solid cylindrical body of insulating material surrounding the central electrode, a flexible conductor wound around the insulating body into the form of a cylindrical electrode, a lead-in conductor at one end of the insulator constituting a connection between the central electrode and the power line, and a conductor passing through the wall of the insulator for connecting the outer electrode to the high frequency apparatus, the interior of the insulator being filled with oil.

6. A capacity coupling for connecting high frequency apparatus with a high voltage electric power line in a wired wireless system, comprising a hollow insulator capable of withstanding the voltage between the power line and earth and the mechanical stresses associated therewith, two electrodes disposed within the insulator in capacitative relationship to one another, a lead-in conductor passing through one end of the insulator and serving to connect one of the electrodes to the power line, a conductor passing through the wall of the insulator at a point remote from the lead-in conductor and serving to connect the second electrode to the high frequency apparatus, and an insulating shield on the outside of the insulator around the high frequency lead serving to minimize the risk of a flash-over between the power line lead-in conductor and the high frequency lead.

7. A capacity coupling for connecting high frequency apparatus with a high voltage electric power line in a wired wireless system, comprising a hollow insulator capable of withstanding the voltage between the power line and earth and the mechanical stresses associated therewith, a rigid conductor disposed within the insulator and constituting one electrode of a condenser, a second electrode surrounding such conductor within the insulator, a solid body of insulating material between the two electrodes serving as dielectric for the condenser, a lead-in conductor passing through one end of the insulator and serving to connect the inner electrode to the power line, a conductor passing through the wall of the insulator at a point remote from the lead-in conductor and serving to connect the outer electrode to the high frequency apparatus, and means external to the insulator for minimizing the risk of a flash-over between the power line lead-in conductor and the high frequency lead.

In testimony whereof I have signed my name to this specification.

LEWIS COLIN GRANT.